Patented Feb. 21, 1939

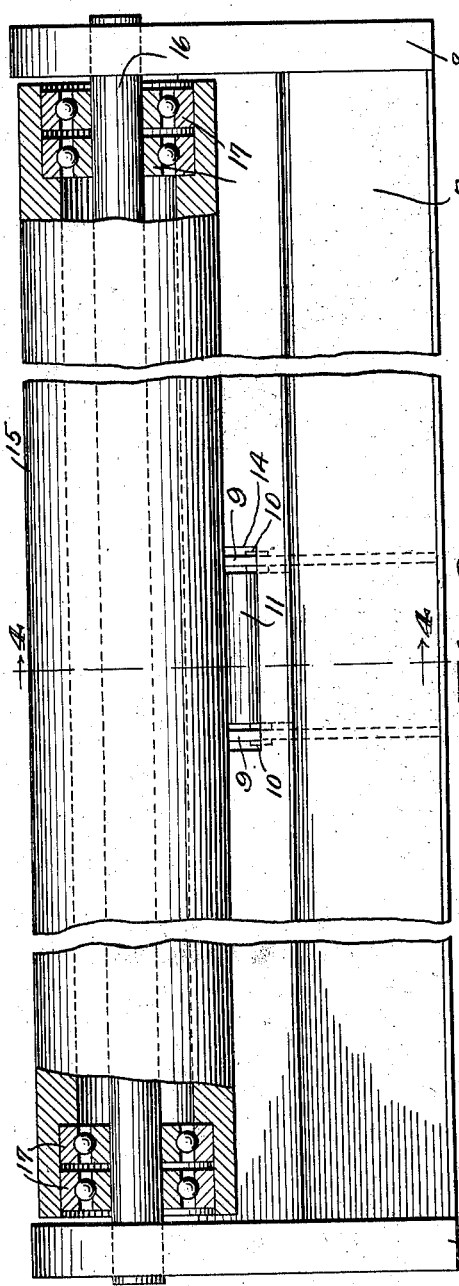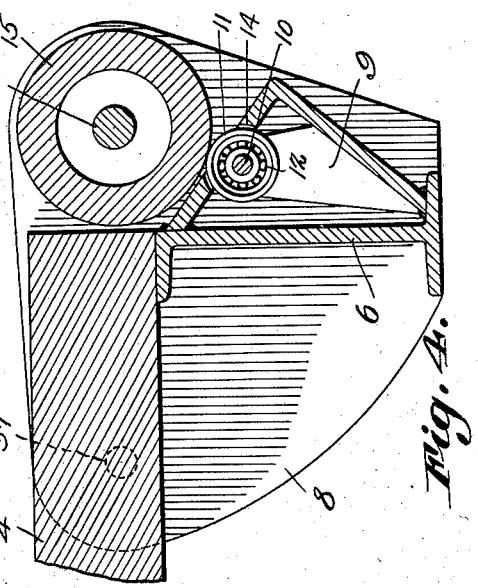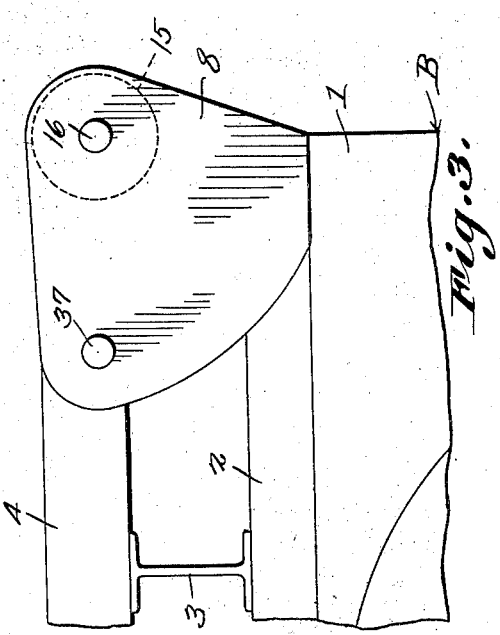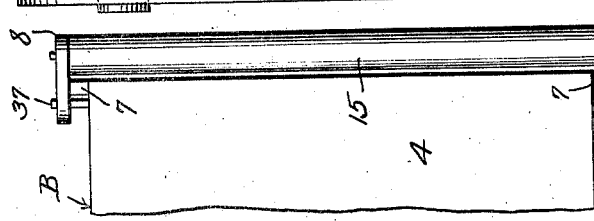

2,148,224

UNITED STATES PATENT OFFICE 2,148,224

LOAD ROLLER FOR TRUCKS

John Jerome Willis, Odessa, Tex.

Original application February 10, 1938, Serial No. 189,838. Divided and this application July 8, 1938, Serial No. 218,232

2 Claims. (Cl. 193—42)

The device forming the subject matter of this application is a load roller for trucks and the subject matter of this application has been divided out of my former application for patent on a Truck tailboard, Serial No. 189,838, filed on February 10, 1938.

The object of the present invention is to provide a novel roller tailboard for trucks and similar vehicles, facilitating the loading of heavy articles, the device being strong, compact, inexpensive and well adapted to withstand the wear and tear to which it is subjected.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in top plan, a device constructed in accordance with the invention, mounted on a portion of a truck;

Fig. 2 is a rear elevation wherein parts are broken away;

Fig. 3 is a side elevation wherein parts are broken away; and

Fig. 4 is a section on the line 4—4 of Fig. 2.

In carrying out the invention, there is provided a wheel-mounted truck body B, which may be constructed as desired; the showing of the particular construction of the truck body is in nowise necessary to the perfect operation of the invention. As shown, but not of necessity, the truck body B comprises lower side beams 1, carrying a lower table 2 on which are mounted cross bars 3 supporting a platform 4. The side beams 1 are connected by an end beam 6, and to the beam 6 is secured a rearwardly extended V-shaped bar 7.

Bracket plates 8 are secured to the ends of the bar 7. To the bar 7, internally thereof, as shown in Figs. 2 and 4, are secured supports 9. In the supports 9 is mounted an auxiliary shaft 10 about which is disposed an auxiliary roller 11, supported from the shaft 10, in the present disclosure, by ball bearings 12; although, of course, any kind of bearings may be used. The auxiliary roller 11 projects upwardly through an opening 14 in the upper flange of the V-shape bar 7 and supports the intermediate portion of a main roller 15 carried on a main shaft 16, through the instrumentality of ball bearings 17, or any other equivalent bearings. The main roller 15 is disposed close to the rear end of the platform 4, and the shaft 16 is carried by the bracket plates 8. The bracket plates 8 may be connected to the edges of the platform 4 by parts 37 which, in the present instance, aid in holding the bracket plates in place, although in my aforesaid copending application No. 189,838, they have another function, which need not be alluded to here.

A heavy object may be rolled upon the platform 4, over the main roller 15, which is supported intermediate its ends by the auxiliary roller 11. If a cable (not shown) is used, the roller 15 may serve as a support for the cable. The roller 15 will be found useful in loading heavy objects on the platform 4 and will prove a useful adjunct to any truck or similar vehicle. The device is adapted to a wide variety of uses, and will be acceptable to anyone having occasion to load or move heavy objects.

Having thus described the invention what is claimed is:

1. In a device of the class described, a body, a main roller supported at the edge of the body for rotation, a bar secured to the body and having upper and lower flanges, the upper flange having an opening, an auxiliary roller engaging and supporting the intermediate portion of the main roller, the auxiliary roller extending through the opening, and means for supporting the auxiliary roller from the lower flange.

2. In a device of the class described, a beam, plates carried by the beam, a main roller supported for rotation in the plates, a V-shaped bar secured to the beam and comprising upper and lower flanges, the upper flange having an opening, supports carried by the lower flange, and an auxiliary roller carried for rotation by the supports, the auxiliary roller extending through the opening and supporting the intermediate portion of the main roller.

JOHN JEROME WILLIS.